(12) United States Patent
Lavin et al.

(10) Patent No.: US 7,991,850 B2
(45) Date of Patent: Aug. 2, 2011

(54) RESILIENT SYSTEM PARTITION FOR PERSONAL INTERNET COMMUNICATOR

(75) Inventors: Jeffrey M. Lavin, Longmont, CO (US); Stephen Paul, Superior, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 900 days.

(21) Appl. No.: 11/192,217

(22) Filed: Jul. 28, 2005

(65) Prior Publication Data

US 2007/0027933 A1    Feb. 1, 2007

(51) Int. Cl.
*G06F 15/16*    (2006.01)
*G06F 17/39*    (2006.01)

(52) U.S. Cl. ........ 709/215; 709/220; 709/221; 711/162; 714/13; 707/640; 707/647; 707/999.202

(58) Field of Classification Search .................. 709/215, 709/221, 224, 220; 707/202, 204, 640, 647, 707/999.202; 711/162; 714/13

See application file for complete search history.

(56) References Cited

U.S. PATENT DOCUMENTS

| | | | | |
|---|---|---|---|---|
| 5,651,139 | A |   | 7/1997 | Cripe et al. .................. 395/490 |
| 5,805,790 | A | * | 9/1998 | Nota et al. ....................... 714/10 |
| 5,907,672 | A | * | 5/1999 | Matze et al. ...................... 714/8 |
| 5,974,517 | A |   | 10/1999 | Gaudet .......................... 711/173 |
| 5,974,567 | A | * | 10/1999 | Dickson et al. ................. 714/27 |
| 6,073,172 | A | * | 6/2000 | Frailong et al. ............... 709/222 |
| 6,154,835 | A | * | 11/2000 | Chrabaszcz et al. ............. 713/1 |
| 6,167,494 | A | * | 12/2000 | Cheston et al. ............... 711/162 |
| 6,178,487 | B1 | * | 1/2001 | Ruff et al. ..................... 711/165 |
| 6,185,666 | B1 | * | 2/2001 | Murray et al. ................. 711/173 |

(Continued)

FOREIGN PATENT DOCUMENTS

EP    1195679 A    4/2002

(Continued)

OTHER PUBLICATIONS

DSLHOME-Technical Working Group: "CPE WAN Management Protocol," Internet citation, May 2004; http://www.dslforum.org/aboutdls/Technical_Reports/TR-069.pdf; retrieved Feb. 4, 2005.

(Continued)

*Primary Examiner* — Alina Boutah
(74) *Attorney, Agent, or Firm* — Hamilton & Terrile, LLP; Gary W. Hamilton

(57) ABSTRACT

The present invention provides a method and apparatus to restore the operating system of a personal internet communicator (PIC) to a "known good" operational state in the event of a catastrophic failure. In an embodiment of the invention, the hard drive of the personal internet communicator is organized in three partitions: 1) a partition for the operating system and related files; 2) a user data partition; and 3) a "restore" partition. The restore partition is hidden by modifying the type of partition that can be detected by the user or any operating system. Upon a catastrophic failure, the system can be returned to an operational state by performing a sector-by-sector restoration to copy an image of the operating system and related system files back to the operating system partition. In various embodiments of the invention, the PIC system state is continuously monitored by a "registry sniffing" routine that maintains a file containing data corresponding to the system state of the PIC. Subsequent to copying the operating system to the OS partition, as discussed above, the system state parameter file is used to modify the operating system to place the PIC in the configuration that existed prior to the catastrophic failure.

14 Claims, 4 Drawing Sheets

U.S. PATENT DOCUMENTS

| | | | |
|---|---|---|---|
| 6,199,179 B1* | 3/2001 | Kauffman et al. | 714/26 |
| 6,247,126 B1* | 6/2001 | Beelitz et al. | 713/1 |
| 6,253,300 B1* | 6/2001 | Lawrence et al. | 711/173 |
| 6,281,894 B1* | 8/2001 | Rive | 715/705 |
| 6,516,372 B1* | 2/2003 | Anderson et al. | 710/300 |
| 6,519,762 B1* | 2/2003 | Colligan et al. | 717/170 |
| 6,523,139 B1* | 2/2003 | Banning et al. | 714/43 |
| 6,615,365 B1* | 9/2003 | Jenevein et al. | 714/6 |
| 6,735,605 B2* | 5/2004 | Bird et al. | 707/205 |
| 6,785,787 B2* | 8/2004 | Smith et al. | 711/162 |
| 6,832,317 B1 | 12/2004 | Strongin et al. | 713/182 |
| 6,845,464 B2* | 1/2005 | Gold | 714/6 |
| 6,880,102 B1* | 4/2005 | Bridge | 714/6 |
| 6,901,493 B1* | 5/2005 | Maffezzoni | 711/162 |
| 6,931,522 B1* | 8/2005 | Raghavan et al. | 713/2 |
| 6,934,881 B2* | 8/2005 | Gold et al. | 714/15 |
| 7,120,823 B2* | 10/2006 | Foster et al. | 714/6 |
| 7,216,251 B2* | 5/2007 | Gaunt et al. | 714/6 |
| 7,275,180 B2* | 9/2007 | Armstrong et al. | 714/13 |
| 7,305,577 B2* | 12/2007 | Zhang | 714/6 |
| 7,409,584 B2* | 8/2008 | Denninghoff et al. | 714/6 |
| 7,412,562 B2* | 8/2008 | Garney | 711/113 |
| 7,415,627 B1* | 8/2008 | Radhakrishnan et al. | 714/4 |
| 7,543,325 B2* | 6/2009 | Westbrook et al. | 725/93 |
| 7,603,440 B1* | 10/2009 | Grabowski et al. | 709/220 |
| 2002/0042892 A1* | 4/2002 | Gold | 714/6 |
| 2002/0083362 A1* | 6/2002 | Semo et al. | 714/4 |
| 2002/0184484 A1 | 12/2002 | Abboud et al. | |
| 2002/0188837 A1* | 12/2002 | Dayan et al. | 713/2 |
| 2003/0221095 A1* | 11/2003 | Gaunt et al. | 713/1 |
| 2004/0078680 A1 | 4/2004 | Hu et al. | |
| 2004/0153724 A1* | 8/2004 | Nicholson et al. | 714/6 |
| 2004/0210792 A1* | 10/2004 | Foster et al. | 714/5 |
| 2004/0247033 A1* | 12/2004 | Cho et al. | 375/240.26 |
| 2005/0078660 A1* | 4/2005 | Wood | 370/352 |
| 2005/0081118 A1* | 4/2005 | Cheston et al. | 714/47 |
| 2005/0132179 A1* | 6/2005 | Glaum et al. | 713/1 |
| 2006/0069902 A1* | 3/2006 | Rui et al. | 713/1 |
| 2006/0212750 A1* | 9/2006 | Denninghoff et al. | 714/6 |
| 2006/0253724 A1* | 11/2006 | Zhang | 714/2 |
| 2007/0011493 A1* | 1/2007 | Du et al. | 714/36 |
| 2007/0244941 A1* | 10/2007 | Reed et al. | 707/205 |
| 2008/0120350 A1* | 5/2008 | Grabowski et al. | 707/202 |
| 2008/0184025 A1* | 7/2008 | Dayan et al. | 713/2 |
| 2010/0011204 A1* | 1/2010 | Hubbard et al. | 713/2 |

FOREIGN PATENT DOCUMENTS

| | | |
|---|---|---|
| EP | 1434135 A1 | 6/2004 |
| EP | 1469393 A | 10/2004 |
| GB | 2404748 A | 2/2005 |
| WO | WO 03009123 A | 1/2003 |
| WO | WO 2004/090722 | 10/2004 |

OTHER PUBLICATIONS

International Search Report and Written Opinion for PCT/US2006/028198 mailed Nov. 10, 2007.

T. Perley et al, "An Overview of the Design of the AMD Personal Internet Communicator," submitted for publication at 2005 Technical, Professional and Student (TPS) Development Conference (Apr. 2005) (8 pages).

AMD Geode GX 533@1.1W Processor Technical Specs, http://www.amd.com/us-en/ConnectivitySolutions/ProductInformation/0..50_2330_9863_9864.00.html, printed Oct. 6, 2005 (1 page).

"AMD Personal Internet Communication (PIC)—Specification," http://www.amdboard.com/pic.html, printed Oct. 6, 2005 (6 pages).

* cited by examiner

RESILIENT SYSTEM PARTITION FOR PERSONAL INTERNET COMMUNICATOR

BACKGROUND OF THE INVENTION

1. Field of the Invention

The present invention relates to the field of information processing systems. In one aspect, the present invention relates to a system and method for providing a resilient system partition that can be used to recover system software to restore the operating condition of an information processing system, such as a personal internet communicator.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information processing systems which are designed primarily to give independent computing power to a single user (or a group of users in the case of personal computers which serve as computer server systems) and are inexpensively priced for purchase by individuals or small businesses.

In recent years, there has been significant growth in the use of the personal computers to exchange information over the Internet. This exchange of information is based on a client/server model with the user's personal computer operating as the client to access data stored on a plurality of Internet servers. Some Internet service providers provide a computer to a user as part of a contractual relationship to provide Internet service. Many customers are relatively unfamiliar with technical aspects of computers and, therefore, it is possible that they will inadvertently corrupt the operating system or download a software file that corrupts the operating system.

Consequently, a significant need exists for preserving the integrity of the operating system and the applications stored on computers, such as those used as personal Internet communicators (PICs) over a communication network provided by an Internet service provider. In particular, there is a need for a method and apparatus that makes it possible to rapidly restore the operating system of a PIC to a "known good" operational state. Further limitations and disadvantages of conventional systems will become apparent to one of skill in the art after reviewing the remainder of the present application with reference to the drawings and detailed description which follow.

SUMMARY OF THE INVENTION

The present invention provides a method and apparatus to restore the disk partition, file system formatting information, and operating system of a personal internet communicator (PIC) to a "known good" operational state in the event of a catastrophic failure. In an embodiment of the invention, the hard drive of the personal internet communicator is organized in three partitions: 1) a partition for the operating system and related files; 2) a user data partition; and 3) a "restore" partition. The restore partition is hidden by modifying the partition type of a partition that is not supported by any operating system and cannot be detected by the user. Upon a catastrophic failure, the system can be returned to an operational state by performing a sector-by-sector restoration to copy an image of the operating system and related system files back to the operating system partition.

In another embodiment of the invention, the PIC system state is continuously monitored by a "registry sniffing" routine that maintains a file containing data corresponding to the system state and user preferences of the PIC. Subsequent to copying the operating system to the OS partition, as discussed above, the system state parameter file is used to modify the operating system to place the PIC in the configuration that existed prior to the catastrophic failure.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
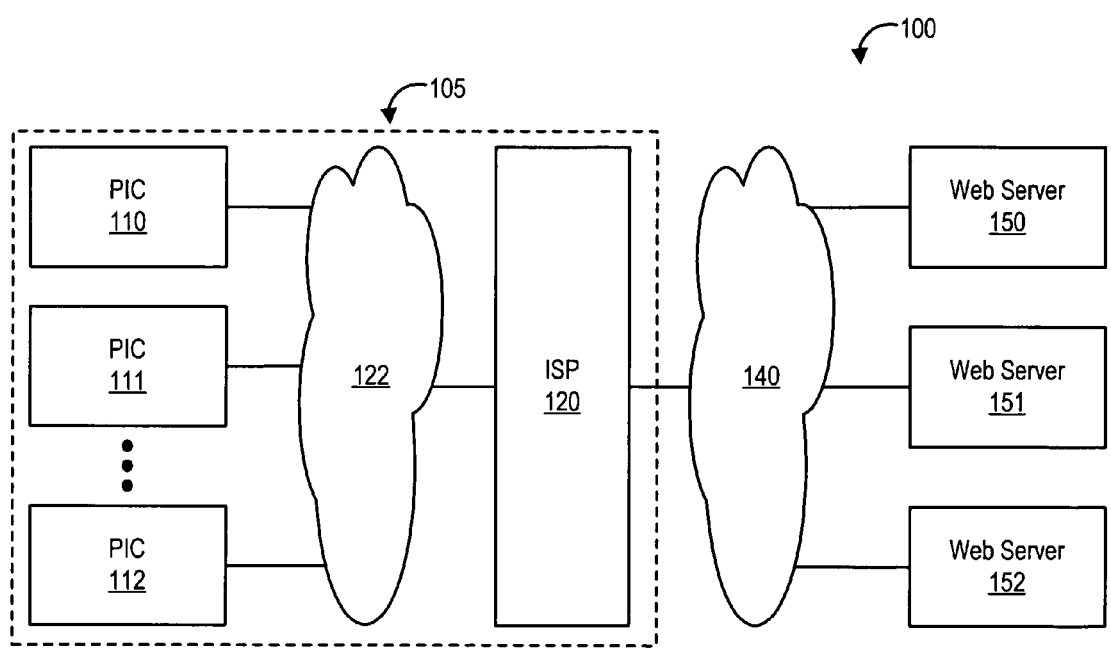
FIG. 1 is a block diagram of a plurality of computer systems communicating over one or more communication networks.

Referring to FIG. 1, a block diagram of an exemplary network 100 is shown wherein a plurality 105 of computer systems 110, 111, 112 communicates over one or more communication networks 140. As illustrated, each computer system (e.g., 110)—also referred to as a multimedia access devices or personal Internet communicators (PICs)—is operably coupled to an Internet service provider (ISP) 120 via one or more communication links 122. The Internet service provider 120 is coupled to the Internet 140 that is further coupled to a plurality of Web host servers 150, 151, 152. A user wishing to access information on the Internet uses a PIC (e.g., 110) to execute an application program stored on the PIC known as a Web browser.

The PIC 110 includes communication hardware and software that allows the PIC 110 to send and receive communications to and from the Internet service provider 120. The communications hardware and software allows the PIC 110 to establish a communication link with the Internet service provider 120. The communication link may be any of a variety of connection types including a wired connection, a direct link such as a digital subscriber line (DSL), T1, integrated services digital network (ISDN) or cable connection, a wireless connection via a cellular or satellite network, phone modem dialup access or a local data transport system, such as Ethernet or token ring over a local area network.

When the customer enters a request for information by entering commands in the Web browser, the PIC 110 sends a request for information, such as a search for documents pertaining to a specified topic, or a specific Web page to the Internet service provider 120 which in turn forwards the request to an appropriate Web host server 150 via the Internet 140. The Internet service provider 120 executes software for receiving and reading requests sent from the browser. The Internet service provider 120 executes a Web server application program that monitors requests, services requests for the information on that particular Web server, and transmits the information to the user's PIC 110.

Each Web host server 150, 151, 152 on the Internet has a known address that the user supplies to the Web browser to connect to the appropriate Web host server. If the information is not available on the user's Web host server 150, the Internet 140 serves as a central link that allows Web servers 150, 151, 152 to communicate with one another to supply the requested information. Because Web servers 150, 151, 152 can contain more than one Web page, the user will also specify in the address which particular Web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 2:
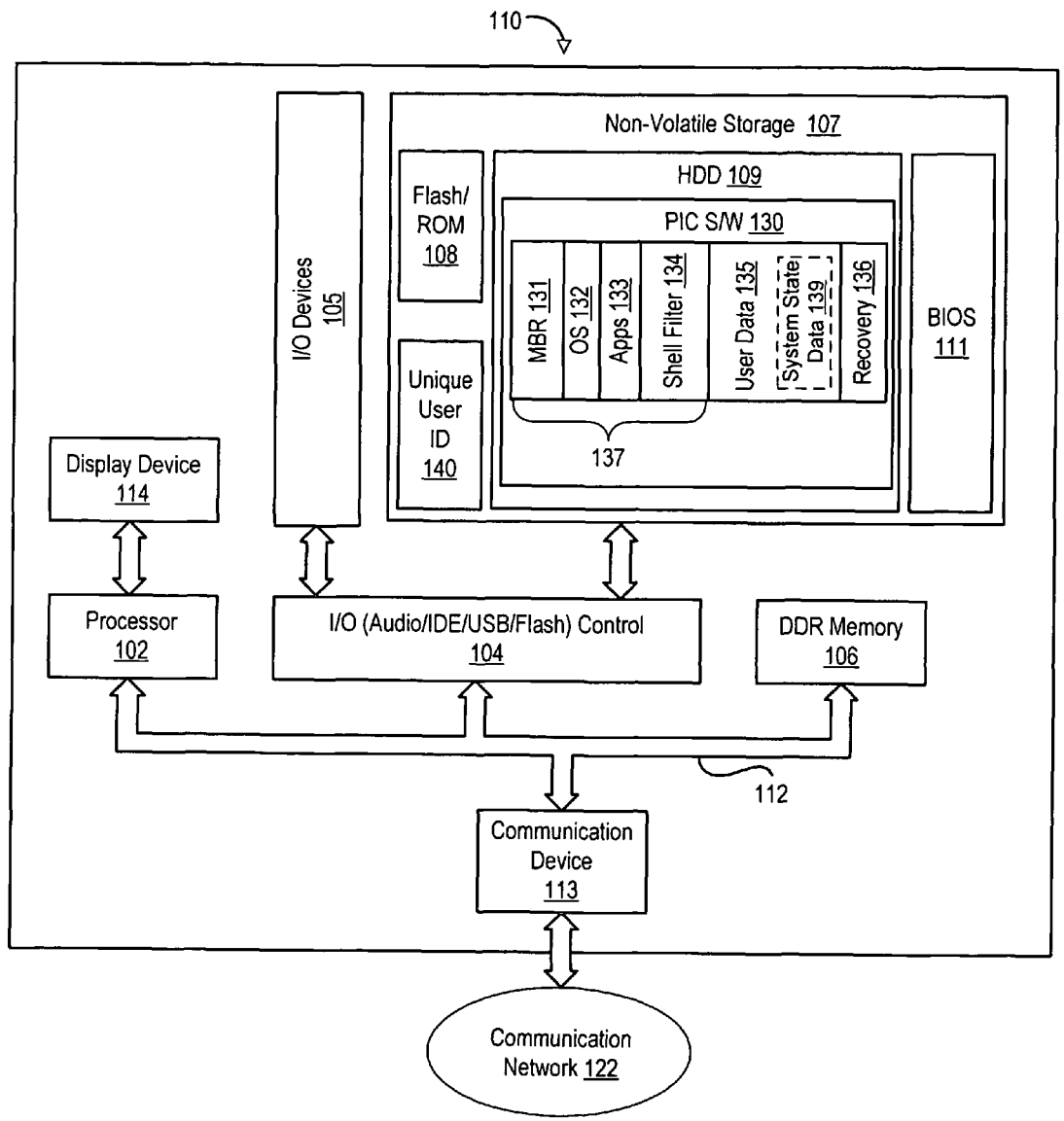
FIG. 2 is a system block diagram of a computer system, such as a personal Internet communicator, in accordance with various embodiments of the present invention.

Referring to FIG. 2, a block diagram of PIC 110 is shown. Referring to FIG. 1, a block diagram of an exemplary computer system 110—also referred to as a multimedia access device or personal Internet communicator (PIC)—is shown. In accordance with a selected embodiment of the present invention, the PIC 110 is designed to be an affordable, easy-to-use and robust consumer device that provides managed Internet access for first-time technology users. To keep the cost affordable and maintain required consumer functionality, a selected embodiment of the PIC 110 includes a monitor or other display device 114 and basic input/output devices 115, such as a USB keyboard and a USB mouse. In addition, ease of use of the PIC 110 is promoted by using preinstalled software with fixed functionality that cannot be upgraded by the user. For example, the preinstalled software may include a basic operating system (such as a the Windows CE operating system) and a suite of productivity tools, including communications applications (such as an Internet browser, e-mail, instant messaging, Macromedia Flash, media player, spreadsheet and word processor), viewer applications (e.g., viewers for PowerPoint, Images and PDF), and print drivers.

Preinstalled software with fixed or reduced functionality improves the first-time user experience by removing complexity from the user's interaction with the PIC 110. To this end, control functionality is included in the PIC 110 to prevent the user from deleting important programs, such as operating system files, application software, program launch icons, start menu items, program files, preinstalled content or other essential files. In addition or in the alternative, the file navigation capabilities provided to the user are structured in an intuitive way to hide program files stored in a hidden partition, such as a system partition and/or to limit access to files and user data stored in a predetermined partition of the hard drive, such as a "My Documents" directory.

The PIC 110 includes a processor 102, input/output (I/O) control device 104, memory (including volatile random access memory (RAM) memory 106 and non-volatile memory 107), communication device 113 (such as a modem) and a display 114. The processor 102, I/O controller 104, memory 106 and communication device 113 are interconnected via one or more buses 112. In a selected embodiment, the processor 102 is implemented as an AMD Geode GX 32-bit x86 compatible processor, the memory 106 is implemented as a 128 MB DDR memory and the display 114 is implemented as a CRT monitor. In addition, the non-volatile memory 107 may include a hard disk drive 109 that is implemented as an integrated 3.5 inch hard disk drive with a minimum capacity of, e.g., 10 GB. Either or both of the memories 106, 107 may be integrated with or external to the PIC 110. As for the communication device 113, an integrated 56K ITU v. 92 Modem with an external connector may be used to support different phone systems throughout the world, though other modems (e.g., a soft modem) may also be used. Of course, it will be appreciated that other device configurations may also be used for the processor 102, memory 106, 107, display 114 and communication device 113. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 2, the I/O control device 104 is coupled to I/O devices 105, such as one or more USB ports, a keyboard, a mouse, audio speakers, etc. The I/O control device 104 is also coupled to non-volatile storage 107, such as a flash memory or other read only memory (ROM) 108 and/or hard disk drive 109. The PIC 110 may be connected to a communication network 122, such as the Internet, by a communication device 113, such as a modem, but the connection may be established by any desired network communication device known to those of skill in the art. Though the processor 102 is shown as being coupled directly to a display device 114, the processor may also be coupled indirectly to the display 114 through a display or I/O controller device. Similarly, the processor is shown as being coupled through the I/O controller 104 to the non-volatile memory 107, though direct coupling is also contemplated.

Various programming codes and software are stored in the PIC memory. For example, the basic input/output system (BIOS) code that starts the PIC 110 at startup may be stored in a BIOS ROM device 111 of the non-volatile storage 107, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS/Bootloader 111 is essentially invisible to the user and includes a compatible bootloader to enable the PIC operating system to be an embedded closed operating system, such as a Windows CE type operating system, though any operating system (including but not limited to Windows-based and Linux-based Operating Systems)

could be supported by the BIOS code. The BIOS/Bootloader 111 is essentially invisible to the user and boots to the operating system.

PIC software 130 and user data may also be stored on the hard drive 109 of the non-volatile storage 107 and executed and/or processed by processor 102. The PIC software 130 may include a master boot record (MBR) 131, an operating system 132, application program(s) 133, user data 135, and a hidden image recovery module 136. The MBR 131 is a small program that is executed when the PIC 110 boots up, and typically resides on the first sector of the hard disk 109. In addition, the MBR 131 may contain a table of partitions on the disk (including the system partition and the user partition). As for the operating system 132, several uniquely configurable operating parameters that can affect the performance of the system are preconfigured as part of the software 130 when it is initially installed on the drive 109. The software 130 also includes application programs 133 that are needed for the PIC 110 to function as specified. For example, the applications 133 may include web browser, Flash player, presentation viewer for PowerPoint, chat, game, compression utility, e-mail, word processor, spreadsheet, PDF viewer, media player and/or drawing applications. In addition, the user data 135 stores all of the user's data so that a user has direct access to the user data. The user data partition 135 includes a system state data file that contains information relating to the settings and operating parameters for the applications and data stored in the PIC 110. The system state information contained in the system state data file 139 includes, but is not limited to, software patches, driver updates and registry data corresponding to a particular operating configuration for the PIC 110. The system state data file 139 is updated on a continuous basis by performing a "registry sniffing" protocol whereby incremental changes in the system's state are monitored.

The system partition 137 is hidden from the user using aggressive concealment techniques to prevent the user from inadvertently or intentionally accessing files stored in this partition. The recovery partition 136 is hidden from the user by using a partition type that is not visible to the user and is not identifiable by any operating system. In accordance with the present invention, predetermined partitions and/or files on the hard drive 109 may be protected against unauthorized access and/or deletion by the user by including a filter program 134 in the PIC software 130 that controls access to the predetermined partition/files by the user. For example, the filter program 134 may provide a shell filter function that restricts the user from seeing or accessing certain restricted programs or files in a predetermined partition. While the functionality of the filter program 134 may be defined in any desired way, a shell filter may be configured to hide predetermined applications or other resources in the operating system partition 132, the applications partition 133 and the recovery partition 136. In various embodiments of the present invention, the shell filter is used to conceal the system state data file 139 that is stored in the user data partition 135.

Figure 3:
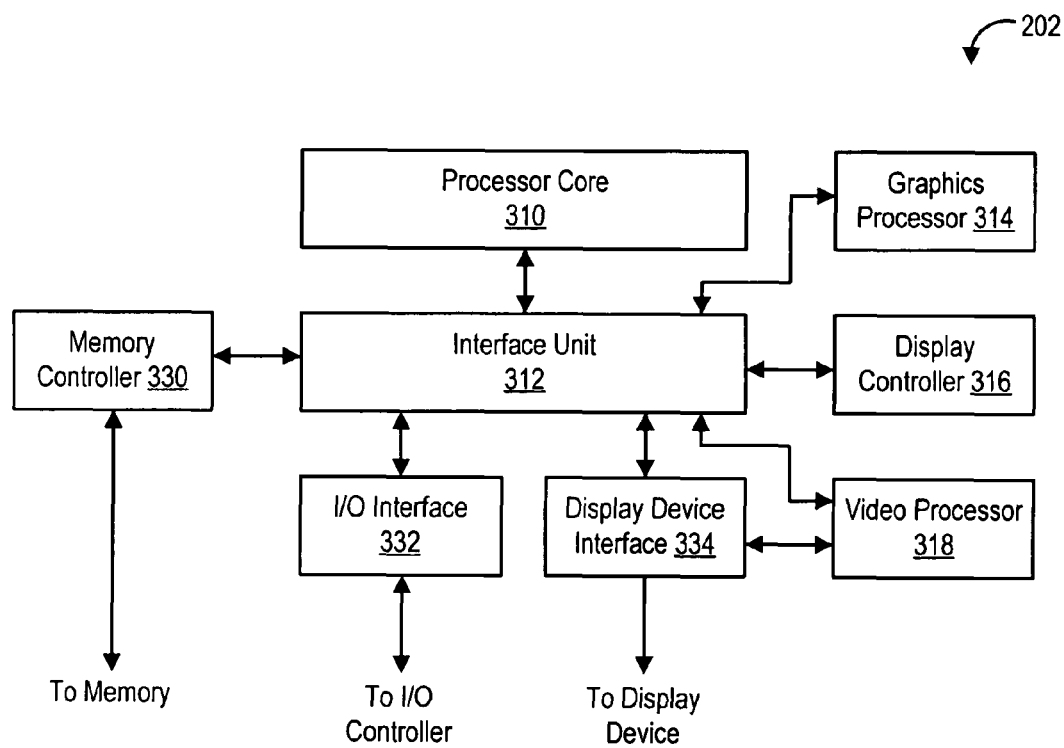
FIG. 3 shows a block diagram of a processor system for use in the personal Internet communicator.

Referring to FIG. 3, a block diagram is shown of the processor 102 that is used to execute the filter program module 134. In one embodiment, the processor 102 is a Geode GX2 processor available from Advanced Micro Devices. The processor 102 includes a processor core 210, a bus or interface unit 212, a graphics processor 214, a display controller 216, and a video processor 218. The processor 102 also includes a memory controller 230, an I/O controller interface 232, and a display device interface 234, though it will be appreciated that these controllers and interfaces may be implemented externally to the processor 102. In the illustrated embodiment, the processor 102 executes software stored in the memory 106, 107 to prevent access and/or deletion of protected files in the PIC software 130, such as the operating system or application files.

The PIC 110 includes a unique user identifier (UUID) 140 that can be used by the ISP 120 to control certain data processing capabilities of the PIC and also can be used to restore the operating status of the PIC in the event of a catastrophic failure. Specifically, the UUID 140 can be used by the ISP 120 to identify a specific PIC 110 and to target that PIC 110 for execution of a protocol to use the recovery partition 136 to restore the system partition 137 to a known good operating state. A BIOS-specific protocol can be utilized to initiate a recovery process even while the operating system is running.

Upon a catastrophic failure, the system can be returned to an operational state by performing a sector-by-sector restoration (using firmware in the BIOS 111) to copy an image of the operating system and related system files back to the system partition 137. Since all file system-specific information is also captured within the sectors, file system-specific formatting of the partition is maintained. Subsequent to copying the operating system to the system partition 137, the (hidden) system state parameter data file 139 is used to modify the necessary operating systems to place the PIC in the configuration that existed prior to the catastrophic failure. To accomplish this, any patches or image updates are restored using the n−1 version, on the assumption that the latest patch or update could have caused the catastrophic failure.

Figure 4:
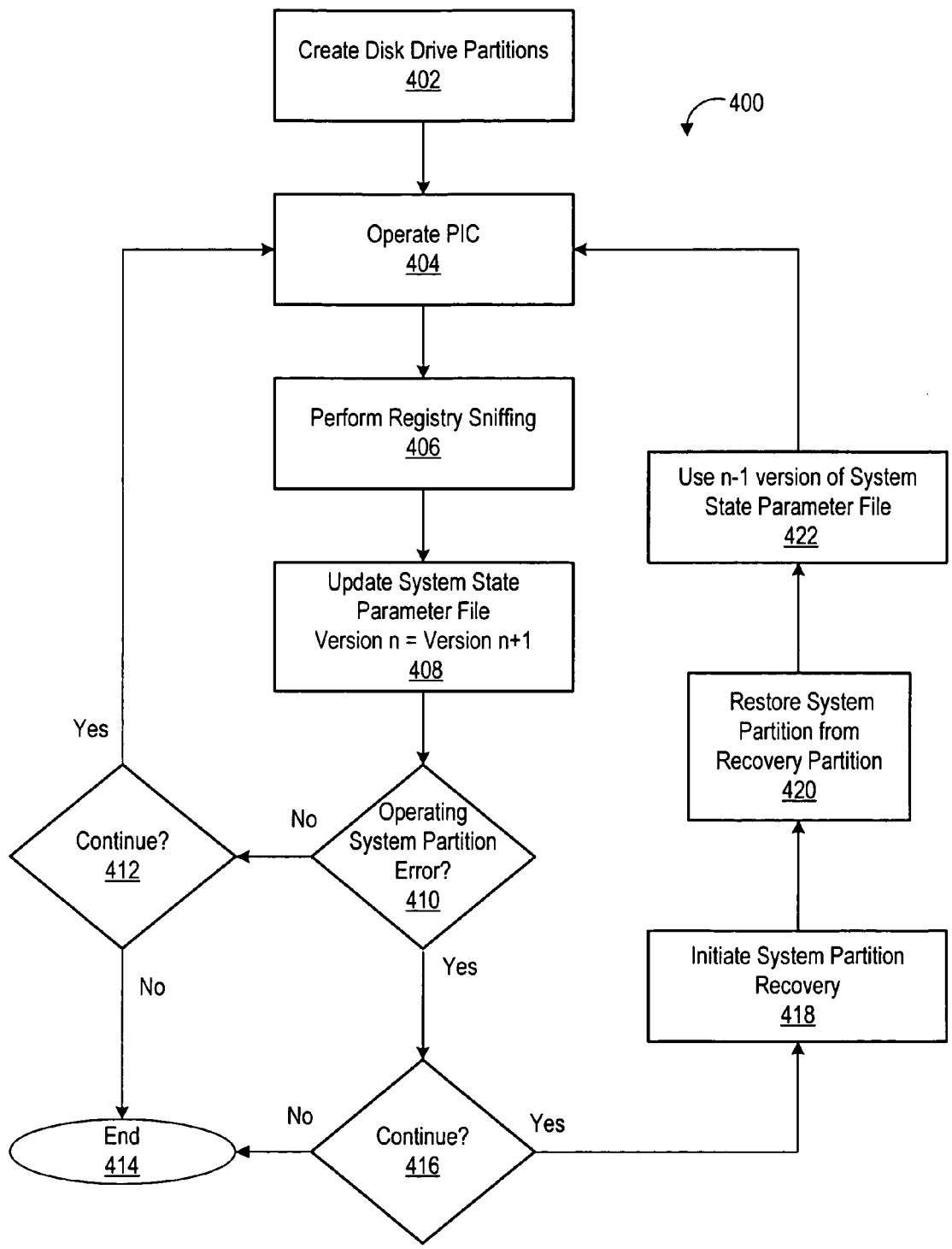
FIG. 4 is a flow chart of the steps implemented to monitor the status of system software and to restore a system to a known good operating state in accordance with the present invention.

FIG. 4 is an illustration of the processing steps 400 for implementing the method and apparatus of the present invention. In step 400, the partitions are created on the hard drive 109 of the PIC 110. In one embodiment of the invention these partitions are created in the initial loading of the hard disk during manufacturing. The partitions created include the system partition 137, the user data partition 135 and the recovery partition 136. Operation of the PIC is initiated in step 404 and the "registry sniffing" protocol is initiated in step 404. In step 406 the current version (n) of the system state parameter file 139 is updated (n=n+1) using the data obtained by the registry sniffing protocol. In step 410 a test is conducted to determine whether there is an error in the system partition. If the result of the test conducted in step 410 indicates that no error exists, processing proceeds to step 412 where a decision is made regarding whether to continue processing. If the result of the decision in step 412 is to continue, then processing proceeds and steps 404-410 are repeated. Otherwise, processing ends in step 414.

If the result of the test conducted in step 410 indicates that there is an error system partition, processing proceeds to step 416 where a decision is made regarding whether to continue processing. If the result of the decision in step 416 is to discontinue, processing is ended in step 414. If, however, the decision in step 416 is to continue, processing continues to step 418 where a process is initiated to restore the system partition to a known good state. In one embodiment of the invention, the recovery process can be initiated automatically by the BIOS, by a hardware key press and detection by the BIOS, or by an application running on operating system. In another embodiment of the invention, the recovery process is initiated by the user. In yet another embodiment of the invention, the recovery process is initiated by an ISP 120 by sending an initiation signal to the PIC 110 over the communication network 122. After the initiation process is initiated, the contents of the recovery partition 136 are copied in step 420 to the system partition 127 on a sector-by-sector basis using restoration process code stored in the BIOS 111. After the system partition is restored, the contents of the system state data file are used in step 422 to restore the operating state of the PIC to the last "known good" state. This is accomplished by using the last "known good" (n−1 version after the update in step 408) system state data.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for restoring a system partition in a memory storage device in a personal Internet communicator, comprising:
    using a registry sniffing protocol to generate modification data corresponding to modifications to the system state of said personal Internet communicator;
    processing said modification data to update a system state data file;
    detecting a defect in a portion of said system partition;
    copying files from a restore partition to said system partition to generate a restored system partition, wherein said restore partition is hidden and said files comprise an image of a known good version of said system partition; and
    subsequently modifying said restored system partition with said system state data file to restore said system state to its operational state prior to said detection of said defect.

2. The method of claim 1, wherein said known good image of said system partition is copied from said restore partition to said system partition on a sector-by-sector basis.

3. The method of claim 2, where the restore process is implemented using a set of BIOS firmware instructions.

4. The method of claim 3, where the restore process is initiated automatically upon detection of said defect in said system partition.

5. The method of claim 3, where the restore process is implemented by a user input.

6. The method of claim 3, where the restore process is implemented upon receipt of a signal from an internet service provider.

7. The method of claim 6, wherein said signal from said internet service provider is executed upon verification of a unique user identifier stored in said personal internet communicator.

8. A device comprising at least one hardware memory having stored thereon a software file comprising executable instructions and data which, when executed by at least one processing device, cause the at least one processing device to:
    use a registry sniffing protocol to generate modification data corresponding to modifications to the system state of said personal Internet communicator; process said modification data to update a system state data file;
    detect a defect in a portion of said system partition; copy from a restore partition to said system partition to generate a restored system partition, wherein said restore partition is hidden and said files comprise an image of a known good version of said system partition; and
    subsequently modify said restored system partition with a-said system state data file to restore said system state-to its operational state prior to said detection of said defect.

9. The device of claim 8, wherein said known good image of said system partition is copied from said restore partition to said system partition on a sector-by-sector basis.

10. The device of claim 9, where the restore process is implemented using a set of BIOS firmware instructions.

11. The device of claim 10, where the restore process is initiated automatically upon detection of said defect in said system partition.

12. The device of claim 10, where the restore process is implemented by a user input.

13. The device of claim 10, where the restore process is implemented upon receipt of a signal from an internet service provider.

14. The device of claim 13, wherein said signal from said internet service provider is executed upon verification of a unique user identifier stored in said personal internet communicator.

* * * * *